United States Patent
Kondoh et al.

(10) Patent No.: US 10,442,091 B2
(45) Date of Patent: Oct. 15, 2019

(54) PRESSURE-SENSITIVE SENSOR, GRIPPING DEVICE, AND ROBOT

(71) Applicants: Tsuneaki Kondoh, Kanagawa (JP); Tomoaki Sugawara, Kanagawa (JP); Yuko Arizumi, Kanagawa (JP); Mayuka Araumi, Tokyo (JP); Mizuki Otagiri, Kanagawa (JP); Junichiro Natori, Kanagawa (JP); Megumi Kitamura, Tokyo (JP); Takahiro Imai, Tokyo (JP); Hideyuki Miyazawa, Kanagawa (JP); Makito Nakashima, Kanagawa (JP)

(72) Inventors: Tsuneaki Kondoh, Kanagawa (JP); Tomoaki Sugawara, Kanagawa (JP); Yuko Arizumi, Kanagawa (JP); Mayuka Araumi, Tokyo (JP); Mizuki Otagiri, Kanagawa (JP); Junichiro Natori, Kanagawa (JP); Megumi Kitamura, Tokyo (JP); Takahiro Imai, Tokyo (JP); Hideyuki Miyazawa, Kanagawa (JP); Makito Nakashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/072,056

(22) PCT Filed: Dec. 14, 2016

(86) PCT No.: PCT/JP2016/087310
§ 371 (c)(1),
(2) Date: Jul. 23, 2018

(87) PCT Pub. No.: WO2017/130591
PCT Pub. Date: Aug. 3, 2017

(65) Prior Publication Data
US 2019/0030732 A1    Jan. 31, 2019

(30) Foreign Application Priority Data

Jan. 29, 2016    (JP) .................................. 2016-016147

(51) Int. Cl.
*G01L 1/16* (2006.01)
*B25J 15/08* (2006.01)
(Continued)

(52) U.S. Cl.
CPC ............. *B25J 15/08* (2013.01); *B25J 13/082* (2013.01); *B25J 19/02* (2013.01); *G01L 1/005* (2013.01);
(Continued)

(58) Field of Classification Search
CPC ...................................................... H01L 41/193
See application file for complete search history.

(56) References Cited

U.S. PATENT DOCUMENTS 7,034,432 B1    4/2006  Pelrine et al.
9,761,790 B2 *  9/2017  Yoo .......................... H01L 41/45
(Continued)

FOREIGN PATENT DOCUMENTS

JP    11-1910 A      1/1999
JP    2011-2256 A    1/2011
(Continued)

OTHER PUBLICATIONS

English translation of the International Search Report dated Jan. 17, 2017 in PCT/JP2016/087310 filed on Dec. 14, 2016, 1 page.
(Continued)

*Primary Examiner* — J. San Martin
(74) *Attorney, Agent, or Firm* — Oblon, McClelland, Maier & Neustadt, L.L.P.

(57) ABSTRACT

A gripping device 18 is provided at the front end of an arm of an assembly robot 2. The gripping device 18 includes a
(Continued)

pair of grippers 20 and 22 capable of opening and closing. The side configured to come into contact with a part 4, of each gripper 20, 22 includes a pressure-sensitive sensor 24. The pressure-sensitive sensor 24 includes a first electrode and a second electrode serving as a pair of electrodes and an intermediate layer formed of rubber or a rubber composition between the pair of electrodes. The intermediate layer is configured to generate electricity when deformed by contact with an object (part 4). The side configured to come into contact with the object, of the intermediate layer is subjected to a surface modification treatment and has a higher hardness than the opposite side.

8 Claims, 10 Drawing Sheets

(51) Int. Cl.
   *G01L 5/22*   (2006.01)
   *G01L 1/00*   (2006.01)
   *B25J 13/08*  (2006.01)
   *B25J 19/02*  (2006.01)
   *G01L 5/00*   (2006.01)

(52) U.S. Cl.
   CPC ............... *G01L 1/16* (2013.01); *G01L 5/00* (2013.01); *G01L 5/226* (2013.01)

(56) References Cited

U.S. PATENT DOCUMENTS

| | | | |
|---|---|---|---|
| 2006/0238066 A1 | 10/2006 | Pelrine et al. | |
| 2011/0309716 A1* | 12/2011 | Jenninger | B32B 3/30 |
| | | | 310/300 |
| 2012/0065516 A1* | 3/2012 | Nishikubo | A61B 8/00 |
| | | | 600/459 |
| 2012/0068572 A1* | 3/2012 | Jenninger | H01L 41/193 |
| | | | 310/300 |
| 2013/0307370 A1 | 11/2013 | Jenninger et al. | |
| 2015/0311012 A1* | 10/2015 | Wada | H01L 41/1132 |
| | | | 200/514 |
| 2016/0276975 A1 | 9/2016 | Fujishima et al. | |
| 2016/0328066 A1 | 11/2016 | Kondoh et al. | |
| 2016/0336505 A1 | 11/2016 | Arizumi et al. | |
| 2016/0341381 A1 | 11/2016 | Imai et al. | |
| 2016/0344309 A1 | 11/2016 | Otagiri et al. | |
| 2017/0207729 A1* | 7/2017 | Kondoh | F03G 5/00 |
| 2017/0324023 A1* | 11/2017 | Kondoh | H01L 41/113 |
| 2019/0089353 A1* | 3/2019 | Araumi | G06F 3/0414 |
| 2019/0103548 A1* | 4/2019 | Sugawara | H01L 41/113 |

FOREIGN PATENT DOCUMENTS

| | | |
|---|---|---|
| JP | 2012-10564 A | 1/2012 |
| JP | 2013-99130 A | 5/2013 |
| JP | 2013-529884 A | 7/2013 |
| JP | 5714200 B2 | 3/2015 |
| JP | 2016-103967 A | 6/2016 |
| WO | WO 2014/105970 A1 | 7/2014 |
| WO | WO 2015/043236 A1 | 4/2015 |

OTHER PUBLICATIONS

English translation of the International Preliminary Report on Patentability dated Jul. 4, 2017 in PCT/JP2016/087310 filed on Dec. 14, 2016, 4 pages.

Extended European Search Report dated Feb. 13, 2019 in European Patent Application No. 16888175.3, 14 pages.

Lin, L., et al., "Triboelectric Active Sensor Array for Self-Powered Static and Dynamic Pressure Detection and Tactile Imaging", ACS NANO, vol. 7 No. 9, XP055548561, Sep. 24, 2013, pp. 8266-8274.

Wang, S., et al., "Triboelectric nanogenerators as self-powered active sensors", Science Direct, Nano Energy, vol. 11, XP055548566, Jan. 2015, pp. 436-462.

\* cited by examiner

PRESSURE-SENSITIVE SENSOR, GRIPPING DEVICE, AND ROBOT

FIELD

The present invention relates to a pressure-sensitive sensor, a gripping device, and a robot.

BACKGROUND

A gripping device provided in, for example, a robot hand is provided with a pressure-sensitive sensor so as to grip objects to be gripped (target objects) different in characteristics, such as shapes, hardnesses, surface properties, and weights, without breaking the objects to be gripped.

The grip state is detected in real time from an output signal of the pressure-sensitive sensor to control the gripping force (contact pressure), the moving speed, and the like. In recent years, in order to accurately handle a wide variety of objects to be gripped, there is a demand for sensitivity as a tactile sensor capable of providing sensation, such as sense of pressure and sense of slip, equivalent to human finger tips.

For example, a pressure-sensitive sensor in which conductive particles such as carbon are dispersed in a rubber material, and that is configured to grasp a change in applied current based on the relation between force and resistance value with a change in contact state of the conductive particles with pressure applied, is known.

The pressure-sensitive sensor having such a configuration requires a power supply and inevitably costs much.

Using a piezoelectric material that deforms to generate electricity as a pressure-sensitive sensor eliminates the need for a power supply.

A vibration-powered device including an elastic sheet deformed by a vibration load, a piezoelectric film placed on a surface of the elastic sheet, and electrodes disposed on both surfaces of the piezoelectric film is known (for example, Patent Literature 1). This vibration-powered device generates electricity using strain caused by tensile force or compression force of the piezoelectric film involved with deformation of the elastic sheet. Polyvinylidene fluoride (PVDF), which is a polymer piezoelectric material, is used for the piezoelectric film.

SUMMARY

Technical Problem

PVDF has flexibility, thus conforms to the shape of an object to be gripped and does not require a power supply.

However, although PVDF has flexibility, the range of the deformation is within the strain range of the material, and the Young's modulus is about 2 GPa. This level can be considered as being stiff as a sensor material that requires high sensitivity.

In other words, the following problem arises when PVDF is used for a pressure-sensitive sensor that generates a voltage signal by deformation of the material, and uses the so-called piezoelectric phenomenon. That is, applying a sufficient load to deform PVDF requires time, and the time taken to start outputting a voltage signal from the moment when the pressure-sensitive sensor comes into contact with an object to be gripped increases, leading to reduction in pressure detection sensitivity at the time of contact. The reduction in pressure detection sensitivity is conspicuous when the object to be gripped is a soft object.

The present invention is made in view of such a situation and has an object to provide a pressure-sensitive sensor with high pressure detection sensitivity at the time of contact, irrespective of difference of characteristics of objects to be gripped.

Solution to Problem

In order to achieve the above object, a pressure-sensitive sensor according to the present invention includes: a pair of electrodes; and an intermediate layer between the pair of electrodes, the intermediate layer being formed of rubber or a rubber composition and configured to generate electricity when deformed by contact with a target object.

Advantageous Effects of Invention

The present invention provides a pressure-sensitive sensor with high pressure detection sensitivity at the time of contact, irrespective of difference of characteristics of objects to be gripped.

DESCRIPTION OF EMBODIMENTS

Embodiments of the present invention will be described below with reference to the figures.

Figure 1:
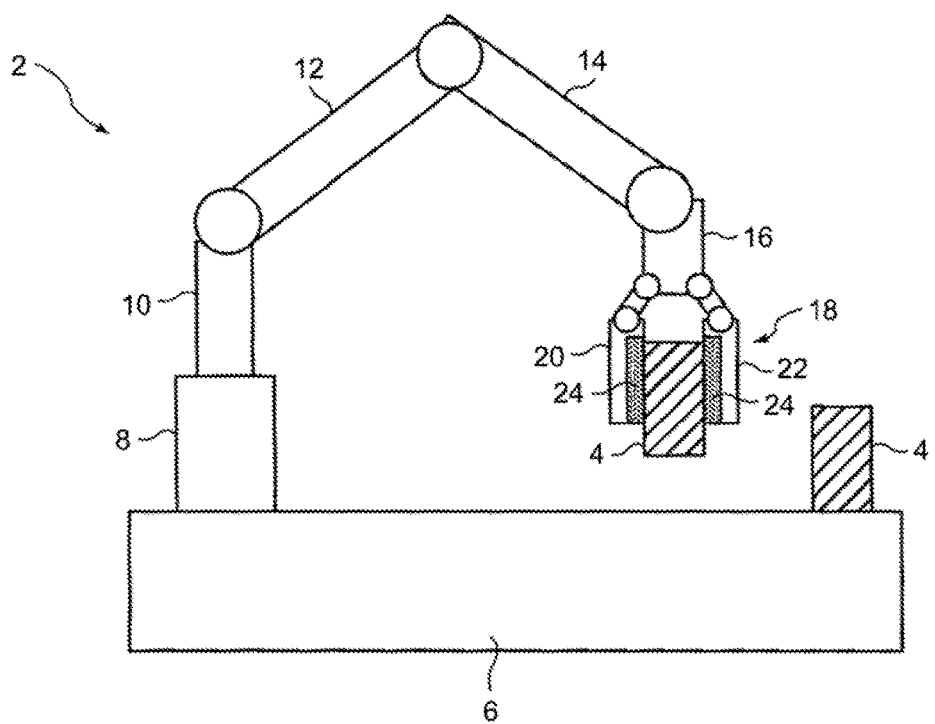
FIG. 1 is a schematic view illustrating a configuration of a robot according to a first embodiment.

A first embodiment will be described based on FIG. 1 to FIG. 6. FIG. 1 illustrates a robot according to the present embodiment. A robot 2 is, for example, an assembly robot for use in a production line.

The robot 2 includes a base 6 on which a part 4 serving as an object to be gripped (target object) is placed, a spindle 8 fixed to the base 6, a fixed link 10 fixed to the spindle 8, movable links 12, 14, and 16, and a gripping device 18 provided at the movable link 16 at the front end.

The spindle 8, the fixed link 10, the movable links 12, 14, and 16, and the gripping device 18 constitute a robot arm.

The part 4 gripped by the gripping device 18 is transferred to an assembly location through a displacement motion of the robot arm.

The gripping device 18 includes a pair of grippers 20 and 22 capable of opening and closing, and each gripper 20, 22 includes a pressure-sensitive sensor 24 on the side that comes into contact with the part 4.

When the pair of grippers 20 and 22 grip the part 4, the pressure-sensitive sensors 24 in contact with the part 4 deform and output voltage signals. The voltage signals are sent to a control device in the robot 2, and the control device adjusts the gripping force and the like of the gripping device 18 based on the signals.

Figure 2:
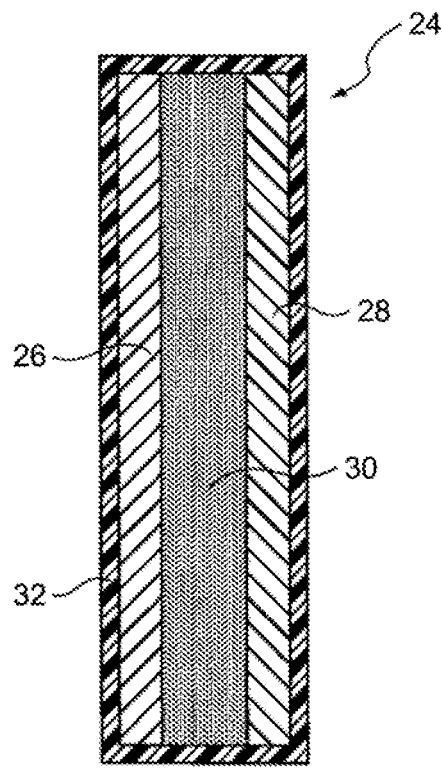
FIG. 2 is a cross-sectional view of a pressure-sensitive sensor.

As illustrated in FIG. 2, the pressure-sensitive sensor 24 includes a first electrode 26 and a second electrode 28 forming a pair of electrodes, and an intermediate layer 30 formed of rubber or a rubber composition between a pair of electrodes and serving as a piezoelectric material that deforms by contact with a target object to generate electricity. The pressure-sensitive sensor 24 further includes a flexible cover 32 that covers at least a surface of the first electrode 26 that comes into contact with a target object, from among a pair of electrodes.

In the present embodiment, the cover 32 covers the entire circumference of a stack structure in which the intermediate layer 30 is sandwiched on both sides in the thickness direction by a pair of electrodes.

The cover 32 is mainly aimed to protect the first electrode 26 from the contact with the part 4 and has a thickness and a material (hardness) that do not impede the transfer of contact pressure to the intermediate layer 30. The material of the cover 32 is, for example, polyethylene terephthalate (PET).

The first electrode 26 and the second electrode 28 may be bonded with or may not be bonded with the intermediate layer 30. The bonding may be partially performed.

The intermediate layer 30 is formed of rubber or a rubber composition, and one side in the stacking direction is subjected to a surface modification treatment and/or an inactivation treatment such that the degree of deformation with the same deformation-applying force differs between the one side and the other side and charge is accumulated. This point will be described in detail later.

At the not-bonded portion of the first electrode 26 and the second electrode 28 with the intermediate layer 30, when deformation occurs, frictional electrification or peeling electrification occurs between the intermediate layer 30 and the opposed electrode during deformation, resulting in accumulation of charge. The accumulation of charge causes changes in capacitances between the intermediate layer 30 and the electrodes to generate electricity.

At the bonded portions of the first electrode 26 and the second electrode 28 with the intermediate layer 30, when deformation occurs, the capacitances change between the intermediate layer 30 and the electrodes to generate electricity.

A comparative evaluation of the sensitivity of the pressure-sensitive sensor 24 in the gripping device 18 according to the present embodiment was conducted.

A probe was pushed with a tacking tester and the time when the applied pressure was detected was compared to perform the comparative evaluation.

As the summary of the evaluation, three steps below are performed with each sensor and data were acquired.

Figure 3:
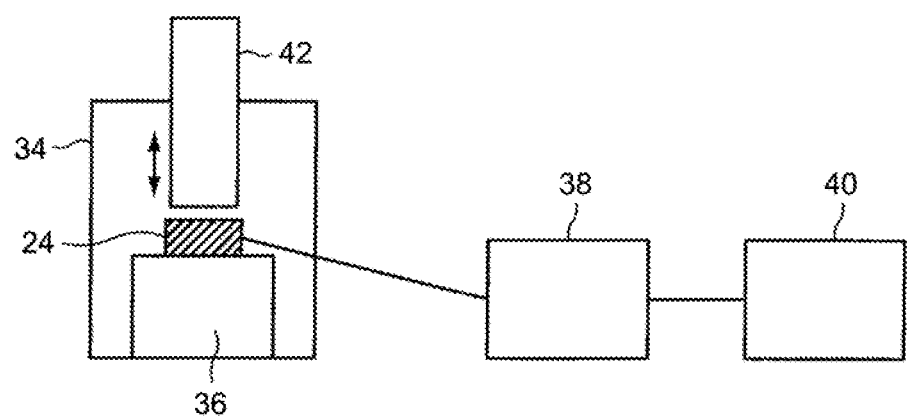
FIG. 3 is a block diagram illustrating an evaluation configuration for the pressure-sensitive sensor.

(1) As illustrated in FIG. 3, affix the pressure-sensitive sensor 24 on a stage 36 of a tacking tester 34 and connect the pressure-sensitive sensor 24 to an oscilloscope 40 through a charge amplifier 38.

Figure 4:
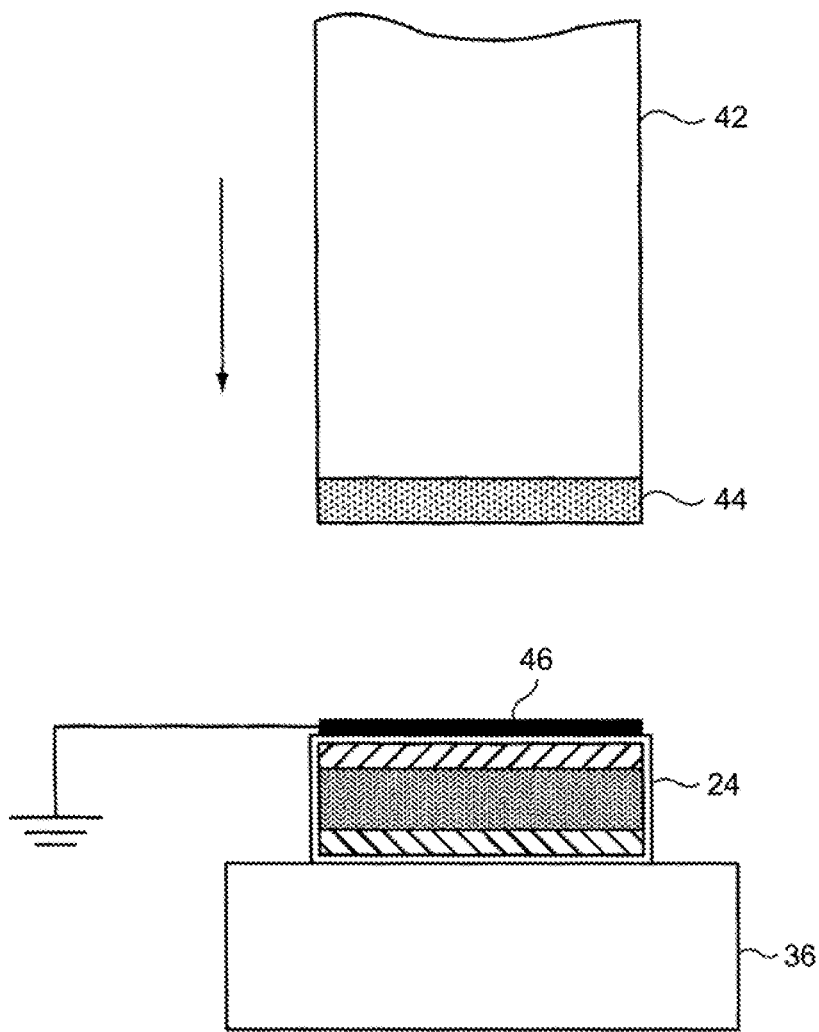
FIG. 4 is a cross-sectional view illustrating a configuration of pressing a probe against the pressure-sensitive sensor by a tacking tester serving as an evaluation machine.

(2) As illustrated in FIG. 4, affix a sponge 44 to the tip end of a probe 42 and perform tacking.

(3) Record a voltage waveform appearing on the oscilloscope 40, and set the average data of three repetitions as the resultant waveform.

The specifications of the pressure-sensitive sensor compared are illustrated in Table 1, the specifications of the sponge used for evaluation are illustrated in Table 2, the settings of the charge amplifier are illustrated in Table 3, the settings of the oscilloscope are illustrated in Table 4, and the evaluation conditions of the tacking tester are illustrated in Table 5.

As illustrated in Table 1, the Young's modulus of PVDF is 2 Gpa, whereas the Young's modulus of the intermediate layer 30 of the pressure-sensitive sensor 24 according to the present embodiment is 0.01 Gpa.

TABLE 1

| Evaluated sensor | PVDF | Pressure-sensitive sensor 24 |
|---|---|---|
| Type | Piezo film sensor | Rubber composition |
| Manufacturer | Tokyo sensor Co., Ltd. | |
| Model No. | DT1-52K/L | |
| Size | 30 mm × 12 mm | 18 mm × 18 mm |
| Thickness | 52 μm | 100 μm |
| Electrode | Ag | Conductive cloth manufactured by Seiren Co., Ltd. |
| Protective cover | Acrylic | PET |
| Entire thickness of device | 70 μm | 390 μm |
| Stiffness (Young's modulus) | 2 GPa | 0.01 GPa |

TABLE 2

| Sponge affixed to probe | |
|---|---|
| Material | Silicone rubber |
| Model No. | Si200 |
| Manufacturer | Sunpolymer Corporation |
| Name | Microcell silicone sponge |
| Size | Φ 10 mm |
| Thickness | 5 mm |
| Slice surface hardness (Type E) | 15 |

TABLE 3

Charge amplifier settings

| | |
|---|---|
| Apparatus name | Charge amplifier |
| Apparatus model No. | 40018-50 |
| Manufacturer | Showasokki Co., Ltd. |
| PU sens (pC/unit) | 9.99 |
| Total length | Short |
| Range (unit/volt) | 50 |

TABLE 4

Oscilloscope settings

| | |
|---|---|
| Triger (V) | 0.4 |
| Vertical scale (V) | 7 |
| Horizontal scale (sec) | 0.25 |
| Model Nember | WaveAce 1001 |
| Serial Number | LCRY2150C00538 |
| Software Version | 5.01.02.27 |
| Record Length | 11250 |
| Sample Interval (sec) | CH1: 0.0004 |

TABLE 5

Measurement conditions of tacking tester

| | |
|---|---|
| Apparatus name | Fixation simulator |
| Apparatus model No. | FSR-1000 |
| Manufacturer | RHESCA Co., LTD. |
| Pattern | 5 (load control) |
| Pressing speed (mm/sec) | 5 |
| Pressing load (gf) | 372 |
| Probe diameter (mm) | 10 |
| Touch detection level (gf) | 20 |
| Pressing stress (MPa) | 0.05 |
| Pressing hold time (sec) | 1 |
| Pull-up speed (mm/sec) | 5 |
| Final pull-up distance (mm) | 3 |
| Plate temperature (° C.) | 25 |

As illustrated in FIG. 4, an aluminum tape 46 grounded was arranged on the upper surface of the pressure-sensitive sensor 24 to prevent occurrence of noise due to unnecessary charge. This is the same as in measurement of the pressure-sensitive sensor of PVDF to be compared.

Figure 5:
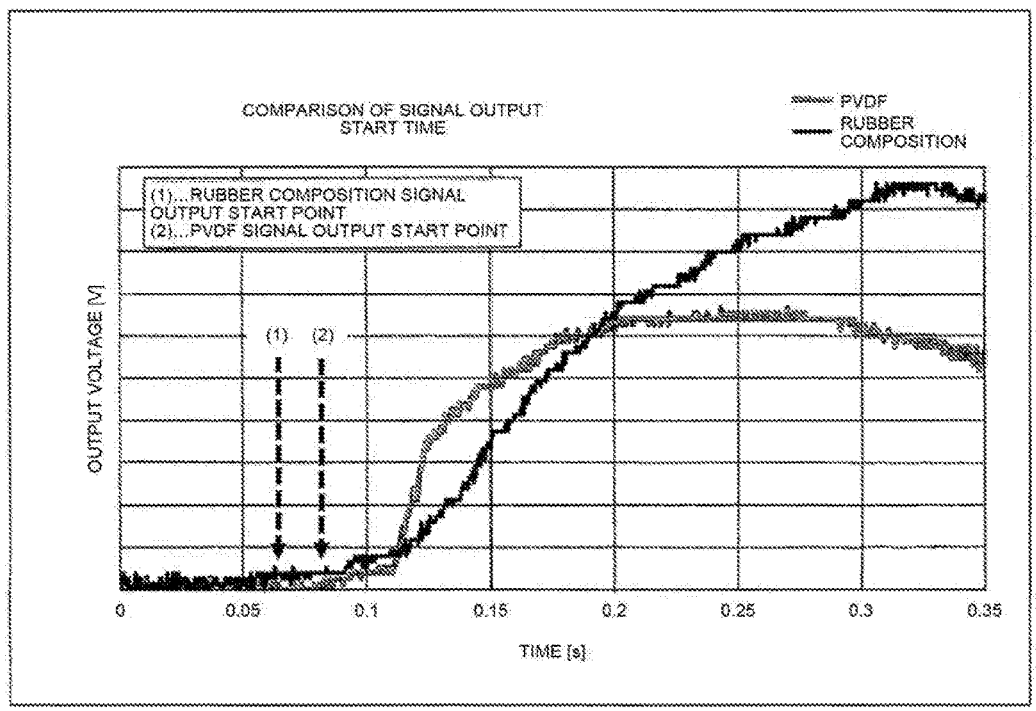
FIG. 5 is a graph of experimental data in a comparison experiment for signal output start time.
Figure 6:
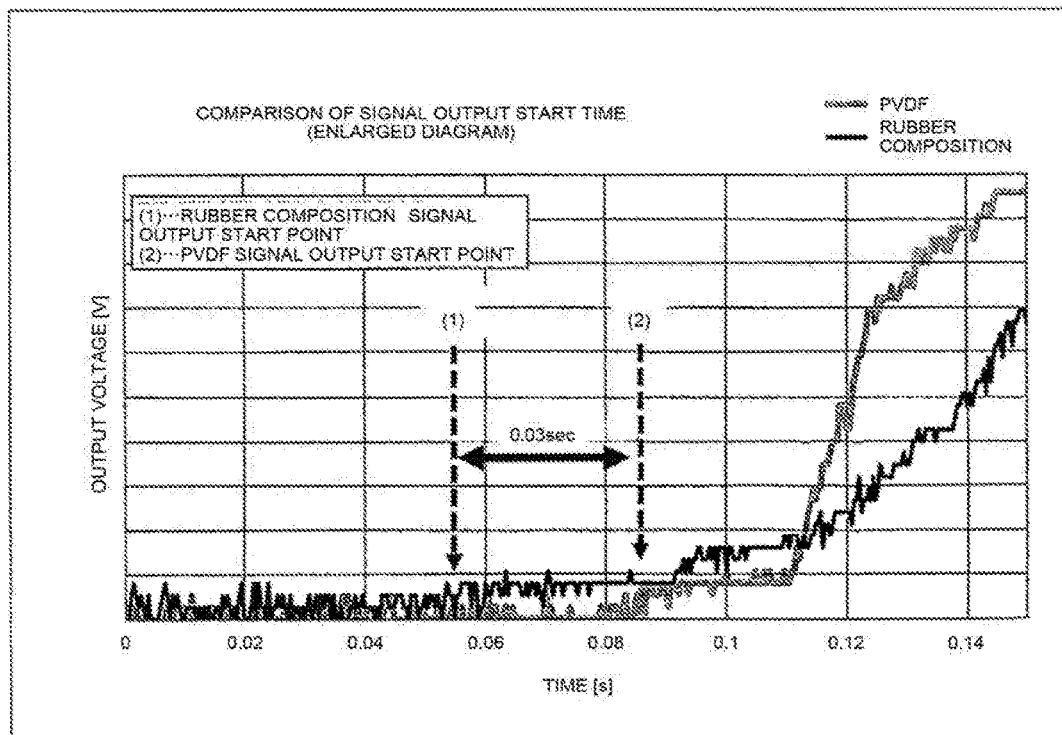
FIG. 6 is an enlarged graph of a signal output start section in FIG. 5.

FIG. 5 illustrates the comparison result and FIG. 6 illustrates the partially enlarged graph thereof. In the pressure-sensitive sensor 24 of the present embodiment having the intermediate layer 30 formed of a rubber composition, the output of a voltage signal starts in about 0.01 sec (10 msec) after the sponge 44 attached to the probe 42 comes into contact with the pressure-sensitive sensor 24.

By contrast, in the pressure-sensitive sensor of PVDF, the output starts in about 0.04 sec (40 msec). That is, there is a delay of about 0.03 sec (30 msec) compared with the pressure-sensitive sensor 24 according to the present embodiment.

The reason why such a large delay occurs in sensor sensitivity is that PVDF has a large Young's modulus, is stiff compared with the intermediate layer 30 as described above, and therefore takes time to deform to start the output of a voltage signal.

In order to prove that the sensitivity of the pressure-sensitive sensor 24 of the present embodiment is high even when coming into contact with a soft object, the sponge 44 was attached to the tip end of the probe 42 as described above.

The origin of the output start time of a voltage signal is the time detected by a pressure sensor installed at the base of the probe 42 of the tacking tester 34.

Figure 7:
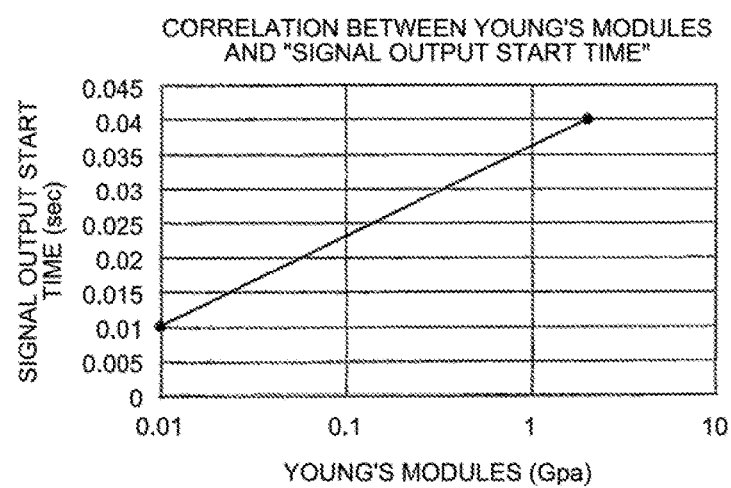
FIG. 7 is a graph illustrating a correlation between the Young's modulus and the signal output start time.

FIG. 7 is a diagram illustrating a plot of the correlation between the measured Young's modulus of the intermediate layer 30 of the present embodiment and PVDF and the signal output start time. It was confirmed that the Young's modulus of the intermediate layer 30 and the signal output start time have a linear correlation.

As the Young's modulus of the intermediate layer 30, values converted from the hardness at a depth of 10 μm with a measuring instrument (ultra-micro hardness tester WIN-HUD manufactured by Fischer Instruments K.K.) that measures hardness in the detailed description of the rubber composition described later and under the same measurement conditions, are used.

Arranging the pressure-sensitive sensor 24 at a portion that is directly in contact with an object to be gripped, of the gripper of the robot arm enables prompt detection of gripping pressure and vibration caused by deviation and enables quick transmission of a control signal to the control device controlling the gripping force with almost no response delay. This configuration enables grip with an adequate stress without breaking the object to be gripped.

As described above, the pressure-sensitive sensor of PVDF has a detection delay of a few tens of msec. When the moving speed of the gripper gripping an object to be gripped is high, the moving amount of the gripper corresponding to the detection delay time increases to cause the gripper to bite into the object to be gripped.

As a consequence, the object to be gripped may be damaged or broken. The operation speed of gripping therefore has to be reduced considering the delay in detection time. The slow gripping operation leads to increase in working time and significantly reduces the productivity.

The pressure-sensitive sensor 24 of the present embodiment can be used to achieve the gripping speed close to human sensation, and further the flexibility of the sensor can reduce the risk of damage and breakage.

A pressure-sensitive sensor requiring a power supply may require a transformer or may become unable to detect due to running out of battery, whereas the pressure-sensitive sensor 24 of the present embodiment is free from such problems and achieves high sensitivity.

A second embodiment will be described based on FIG. 8 and FIG. 9. The same parts as in the foregoing embodiment are denoted by the same reference signs and the description of the configuration and function above will be omitted as necessary (this is applicable to the other embodiments below).

In the foregoing embodiment, the gripping device 18 is configured such that a pair of grippers 20 and 22 move relatively to grip an object to be gripped. Alternatively, a gripper may grip an object to be gripped in cooperation with another member.

Figure 8:
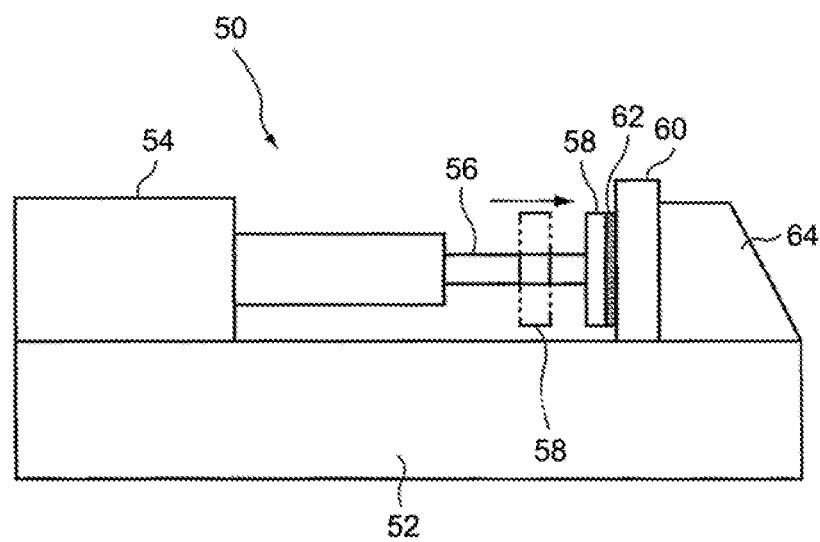
FIG. 8 is a schematic view illustrating a configuration of a gripping device according to a second embodiment.

As illustrated in FIG. 8, a gripping device 50 in the present embodiment includes a base 52, a stepwise support 54 fixed to the base 52, and a cylinder 56 supported on the support 54 so as to be movable forward and backward in the horizontal direction. The gripping device 50 further includes a gripper 58 fixed to the front end of the cylinder 56 and a pressure-sensitive sensor 62 provided on the side that comes into contact with an object to be gripped 60, of the gripper 58. The pressure-sensitive sensor 62 has a similar configuration as the pressure-sensitive sensor 24.

Figure 9:
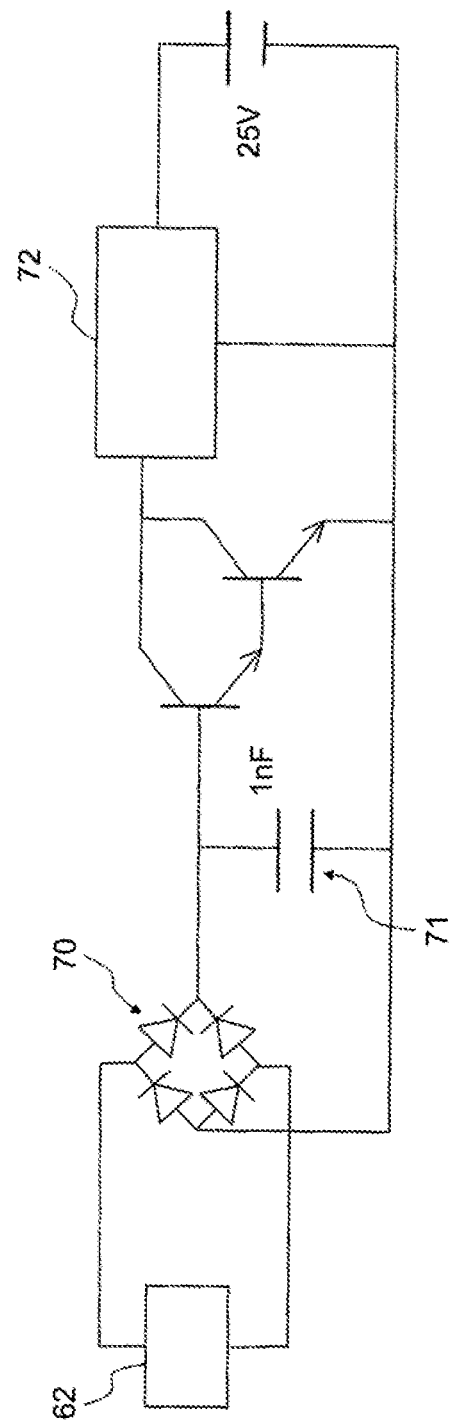
FIG. 9 is a control circuit diagram of the device.

FIG. 9 illustrates a control circuit for the cylinder 56 by the pressure-sensitive sensor 62.

The pressure-sensitive sensor 62 is connected to a motor driver 72 of a motor for driving the cylinder 56, through a diode bridge 70, a 1 nF capacitor 71, and a transistor. The motor is driven, for example, with a 25-V power supply.

When an object to be gripped 60 is placed on the base 52, the cylinder 56 extends and the gripper 58 moves to the right in the figure to grip the object to be gripped 60 with a pad 64 serving as another member fixed to the base 52.

This gripping allows the object to be gripped 60 to be positioned at a predetermined location and, subsequently, for example, another robot performs processing such as sealing of the object to be gripped 60.

Also in the present embodiment, a signal to the motor for the cylinder 56 is quickly transmitted based on a signal from the pressure-sensitive sensor 62, to enable gripping of the object to be gripped 60 with an adequate stress without breaking the object to be gripped 60 and to achieve the effects such as preventing reduction in productivity otherwise caused by a detection delay.

The gripping device 50 may be applied to a robot.

Figure 10:
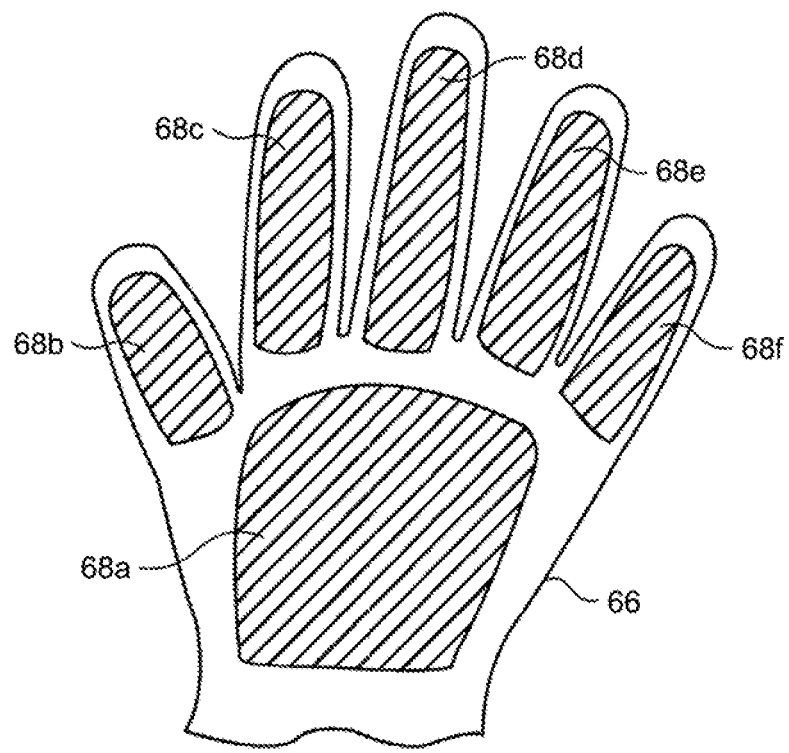
FIG. 10 is a view illustrating an application example of a pressure-sensitive sensor to a glove in a third embodiment.

FIG. 10 illustrates a third embodiment.

A pressure-sensitive sensor 68a with a large area is provided at a portion corresponding to the palm of a glove 66, and pressure-sensitive sensors 68b, 68c, 68d, 68e, and 68f each having a small area are provided at finger portions. The pressure-sensitive sensors 68a to 68f have a similar configuration as the pressure-sensitive sensor 24.

The glove 66 is worn on a human hand or an artificial hand so that human sensation can be converted into an electrical signal without unharmonious. In other words, the contact force on the object to be gripped can be quantified with an electrical signal.

This configuration enables reproduction of tactile sensation equivalent to human skin, provision of sensation by direct electrical stimulation to the brain, and the like.

When a pressure-sensitive sensor is used in a feedback circuit in telemedicine by a surgical robot, or the like, reconstruction of tactile sensation with artificial skin on an artificial limb, or the like, it is an important requirement that a delay in contact detection should be small.

The neurotransmission time from the toe to the head of a human is said to be 20 to 30 msec (the transmission time from the head to the toe is assumed for a height of 170 cm). In this point of view, the above-noted pressure-sensitive sensor of PVDF serving as a comparative example is not preferable because the delay time in contact detection is 30 msec as described above, which is the level that gives human beings sense of incongruity.

The pressure-sensitive sensor of the present embodiment can be used to implement a tactile sensation system that is less likely to give sense of incongruity. This system can avoid medical accidents in surgery with a surgical robot in which a spot decision is required, the risk of a tumble due to failing to grab a handle owing to a delay in contact detection, and the like.

[Heat Resistance Test]

A heat resistance test for the pressure-sensitive sensor was conducted. In the evaluation, the amount of generated power was measured under conditions of 24° C. and 40 RH % according to the amount of generated power-evaluating method below. Subsequently, a high temperature load at 150° C. for 24 hours was applied by an air-blowing constant temperature oven (model No. DN410H manufactured by Yamato Scientific Co., Ltd.).

Subsequently, after the sensor was taken out and left to stand for 10 hours at 24° C. and 40 RH %, the amount of generated power was measured again. The difference of generated voltage resulting from the high-temperature load was evaluated according to the criteria below.

<Amount of Generated Power-Evaluating Method>

A sample of the pressure-sensitive sensor having the same configuration as the first embodiment was fixed on a 10 mm-thick silicone rubber sponge, and an iron ball (weight of 200 g) was dropped from a height of 10 cm onto the pressure-sensitive sensor. The peak voltage generated between both electrodes was measured using an oscilloscope. The measurement was conducted five times, and the obtained average value was considered as the measured value.

<Evaluation>

The ratio relative to the initial measured value of an evaluation sample of PVDF at room temperature was evaluated according to the criteria below.

[Evaluation Criteria]

○: equal to or greater than the initial measured value of PVDF at room temperature x: less than the initial measured value of PVDF at room temperature (○ is the acceptable level.)

The evaluation result is illustrated in Table 6.

TABLE 6

| Intermediate layer material | Initial | | | After high-temperature load | | |
|---|---|---|---|---|---|---|
| | Voltage (V) | Ratio | Evaluation | Voltage (V) | Ratio | Evaluation |
| Rubber composition | 48.4 | 7.56 | ○ | 39.6 | 6.18 | ○ |
| PVDF | 6.4 | 1 | — | 1.6 | 0.25 | x |

As is clear from Table 6, the voltage output from the pressure-sensitive sensor of a rubber composition is 7.56 times (48.4 V) as high as the initial PVDF voltage (6.4 V). This voltage is 6.18 times even after storage at 150° C. for 24 hours, and it is understood that the amount of generated power can be kept well even after high-temperature load.

This is because the voltage at the time of contact is also kept and therefore the time taken to reach the detection limit voltage is less reduced in a control system connected with the pressure-sensitive sensor, for example, and consequently, the sensitivity is kept.

By contrast, in the case of PVDF, the amount of generated power of PVDF after storage at 150° C. for 24 hours is significantly reduced, 0.25 times the initial amount of generated power at room temperature. This reduction leads to reduction of the time taken to reach the detection limit voltage in a control system connected with the pressure-sensitive sensor, for example, that is, reduction in sensitivity.

Based on the foregoing, the pressure-sensitive sensor of the present embodiment formed of a rubber composition keeps the sensitivity even at high temperatures, whereas it is hard for the pressure-sensitive sensor of PVDF to keep the sensitivity. Therefore, when the pressure-sensitive sensor formed of a rubber composition is attached, for example, to the gripper of a robot arm, a soft material in 100° C. hot water can be gripped without breaking the material, and it is possible to implement a cooking robot.

When the pressure-sensitive sensor is mounted on a heat-resistant glove, the voltage generated from the pressure-sensitive sensor is fed back to human tactile sensation, so that a high-temperature object unbearable by human skin can be handled with human tactile feeling being kept. This configuration prevents slippage and enables transfer of a soft object without breaking, thereby improving the work productivity in a high temperature environment.

Although implementations on a robot arm and a glove have been described in the foregoing embodiments, the present invention is not limited thereto.

For example, the pressure-sensitive sensor according to the present invention can be mounted on clothes to implement a system for monitoring human motion or a system that quantifies fitting of clothing and enables ordering of clothes fitting individuals.

The pressure-sensitive sensor according to the present invention can be mounted on a shoe insole to implement a system for detecting movement of the center of gravity during walking or can be placed on the entire inside of a shoe to implement a system for predicting shoe sores.

In addition, a variety of developments can be contemplated in applications that detect pressure at high sensitivity and require flexibility.

The details of the material of the electrode and the intermediate layer for exhibiting the characteristics described above, and the like will be described below.

[First Electrode and Second Electrode]

The material, shape, size, and structure of the first electrode and the second electrode are not limited and can be selected as appropriate according to the purpose.

The first electrode and the second electrode may be identical or different in material, shape, size, and structure, and are preferably identical.

Examples of the material of the first electrode and the second electrode include metals, carbon-based conductive materials, and conductive rubber compositions.

Examples of the metals include gold, silver, copper, aluminum, stainless steel, tantalum, nickel, and phosphor bronze. Examples of the carbon-based conductive materials include carbon nanotubes, carbon fibers, and graphite. Examples of the conductive rubber compositions include a composition containing a conductive filler and rubber.

Examples of the conductive filler include carbon materials (for example, Ketjen black, acetylene black, graphite, carbonaceous fibers, carbon fibers (CF), carbon nanofibers (CNF), carbon nanotubes (CNT), graphene), metal fillers (for example, gold, silver, platinum, copper, aluminum, nickel), conductive polymer materials (for example, a derivative of any one of polythiophene, polyacetylene, polyaniline, polypyrrole, poly(p-phenylene), and poly(p-phenylene vinylene), or what obtained by adding dopants represented by anions and cations to the derivative), and ionic liquid. These may be used singly or in combination of two or more.

Examples of the rubber include silicone rubber, modified silicone rubber, acrylic rubber, chloroprene rubber, polysulfide rubber, urethane rubber, isobutyl rubber, fluorosilicone rubber, ethylene rubber, natural rubber (latex), ethylene propylene rubber, nitrile rubber, and fluoro rubber. These may be used singly or in combination of two or more.

An example of the shape of the first electrode and the shape of the second electrode is a thin film. The structure of the first electrode and the structure of the second electrode may be, for example, fabric, nonwoven fabric, knit fabric, mesh, sponge, or nonwoven fabric formed of layered fibrous carbon material.

The average thickness of the electrode is not limited and can be selected as appropriate according to the purpose. The average thickness of the electrode is preferably 0.01 μm to 1 mm, more preferably 0.1 μm to 500 μm, in terms of conductivity and flexibility. If the average thickness is 0.01 μm or greater, the mechanical strength is acceptable, and the conductivity is improved. If the average thickness is 1 mm or smaller, the device is deformable, and the power generation performance is satisfactory.

[Intermediate Layer]

The intermediate layer has flexibility.

The intermediate layer satisfies at least one of condition (1) and condition (2) below.

Condition (1): when the intermediate layer is pressed in the direction orthogonal to the plane of the intermediate layer, the amount of deformation at the first electrode (one side) of the intermediate layer is different from the amount of deformation at the second electrode (the other side) of the intermediate layer.

Condition (2): the universal hardness (H1) in 10-μm indentation at the first electrode of the intermediate layer is different from the universal hardness (H2) in 10-μm indentation at the second electrode of the intermediate layer.

In the intermediate layer, the amount of deformation or the hardness differs between both surfaces as described above, yielding a large amount of generated power.

In the present embodiment, the amount of deformation refers to the maximum depth of indentation of an indenter pressed against the intermediate layer under the following conditions.

{Measurement Conditions}

Measuring device: ultra-micro hardness tester WIN-HUD manufactured by Fischer Instruments K.K.

Indenter: square pyramid diamond indenter with an opposed face angle of 136°

Initial load: 0.02 mN

Maximum load: 1 mN

Load increase time from initial load to maximum load: 10 seconds.

The universal hardness is obtained by the following method.

{Measurement Conditions}

Measuring device: ultra-micro hardness tester WIN-HUD manufactured by Fischer Instruments K.K.

Intender: square pyramid diamond indenter with an opposed face angle of 136°

Depth of indentation: 10 μm

Initial load: 0.02 mN

Maximum load: 100 mN

Load increase time from initial load to maximum load: 50 seconds.

The ratio (H1/H2) between the universal hardness (H1) and the universal hardness (H2) is preferably 1.01 or greater, more preferably 1.07 or greater, particularly preferably 1.13 or greater. The upper limit value of the ratio (H1/H2) is not limited and selected as appropriate, for example, depending on the degree of flexibility required in the use state and the load in the use state. The upper limit value is preferably 1.70 or smaller. Here, H1 is the universal hardness of a relatively hard surface, and H2 is the universal hardness of a relatively soft surface.

The material of the intermediate layer is not limited and can be selected as appropriate according to the purpose. Examples of the material include rubber and a rubber composition. Examples of the rubber include silicone rubber, fluorosilicone rubber, acrylic rubber, chloroprene rubber, natural rubber (latex), urethane rubber, fluoro rubber, and ethylene propylene rubber. These may be used singly or in combination of two or more. Among these, silicone rubber is preferred.

The silicone rubber may be any rubber that has an organopolysiloxane bond and can be selected as appropriate according to the purpose. Examples of the silicone rubber include dimethyl silicone rubber, methyl phenyl silicone rubber, and modified silicone rubber (for example, acrylic modified, alkyd modified, ester modified, epoxy modified). These may be used singly or in combination of two or more.

Examples of the rubber composition include compositions containing a filler and the rubber. Among these, a silicone rubber composition containing the silicone rubber is preferred because of high power generation performance.

Examples of the filler include organic filler, inorganic filler, and organic-inorganic composite filler. The organic filler may be any organic compound and can be selected as appropriate according to the purpose. Examples of the organic filler include fluoroplastic fine particles, such as acrylic fine particles, polystyrene fine particles, melamine fine particles, and polytetrafluoroethylene, silicone powder (silicone resin powder, silicone rubber powder, silicone composite powder), rubber powder, wood flour, pulp, and starch. The inorganic filler may be any inorganic compound and can be selected as appropriate according to the purpose.

Examples of the inorganic filler include oxides, hydroxides, carbonates, sulfates, silicates, nitrides, carbons, metals, and other compounds.

Examples of the oxides include silica, diatomite, alumina, zinc oxide, titanium oxide, iron oxide, and magnesium oxide.

Examples of the hydroxides include aluminum hydroxide, calcium hydroxide, and magnesium hydroxide.

Examples of the carbonates include calcium carbonate, magnesium carbonate, barium carbonate, and hydrotalcite.

Examples of the sulfates include aluminum sulfate, calcium sulfate, and barium sulfate.

Examples of the silicates include calcium silicate (wollastonite, xonotlite), zircon silicate, kaoline, talc, mica, zeolite, pearlite, bentonite, montmorillonite, sericite, activated clay, glass, and hollow glass beads.

Examples of the nitrides include aluminum nitride, silicon nitride, and boron nitride.

Examples of the carbons include Ketjen black, acetylene black, graphite, carbonaceous fibers, carbon fibers, carbon nanofibers, carbon nanotubes, fullerene (including derivatives thereof), and graphene.

Examples of the metals include gold, silver, platinum, copper, iron, aluminum, and nickel.

Examples of the other compounds include potassium titanate, barium titanate, strontium titanate, lead zirconate titanate, silicon carbide, and molybdenum sulfide. The inorganic filler may be surface-treated.

The organic-inorganic composite filler may be any compound that includes an organic compound and an inorganic compound in combination at the molecular level.

Examples of the organic-inorganic composite filler include silica-acrylic composite fine particles and silsesquioxane.

The average particle size of the filler is not limited and can be selected as appropriate to purpose. The average particle size is 0.01 μm to 30 μm, more preferably 0.1 μm to 10 μm. If the average particle size is 0.01 μm or greater, the power generation performance may be improved. If the average particle size is 30 μm or smaller, the intermediate layer is deformable, and the power generation performance can be increased.

The average particle size can be determined according to a known method using a known particle size distribution measuring device, for example, Microtrac HRA (manufactured by Nikkiso Co., Ltd).

The filler content is preferably 0.1 parts by mass to 100 parts by mass, more preferably 1 part by mass to 50 parts by mass with respect to 100 parts by mass of rubber. If the content is 0.1 parts by mass or more, the power generation performance may be improved. If the content is 100 parts by mass or less, the intermediate layer is deformable, and the power generation performance can be increased.

The other components are not limited and can be selected as appropriate according to the purpose. An example of the other components is an additive. The other component content can be selected as appropriate to a degree that does not impair the object of the present invention.

Examples of the additive include cross-linking agent, anti-degradant, heat-resistant agent, and colorant.

The process of preparing materials that constitute the intermediate layer is not limited and can be selected as appropriate according to the purpose. For example, the rubber composition can be prepared by mixing the rubber and the filler and, if necessary, the other components, and kneading and dispersing the materials.

The process of forming the intermediate layer is not limited and can be selected as appropriate according to the purpose. For example, a thin film of the rubber composition may be formed by applying the rubber composition on a base material by blade coating, die coating, or dip coating, and then curing by heat or electron beams.

The average thickness of the intermediate layer is not limited and can be selected as appropriate according to the purpose. The average thickness is preferably 1 μm to 10 mm, more preferably 20 μm to 1 mm in terms of deformability. The average thickness within the preferred range can ensure the film formation and does not prevent deformation, leading to good power generation.

The intermediate layer preferably has an insulation property. An example of the insulation property is preferably a volume resistivity of $10^8$ Ωcm or higher, more preferably a volume resistivity of $10^{10}$ Ωcm or higher. The intermediate layer may be a multilayer structure.

(Surface Modification Treatment and Inactivation Treatment)

Examples of the process for making amounts of deformation or hardnesses different between both surfaces of the intermediate layer include a surface modification treatment or an inactivation treatment. Both of these treatments may be performed, or one of these treatments may be performed.

<Surface Modification Treatment>

Examples of the surface modification treatment include plasma treatment, corona discharge treatment, electron beam irradiation, ultraviolet irradiation, ozone treatment, and radiation (X-rays, α-rays, β-rays, γ-rays, neutron rays) treatment. Among these treatments, plasma treatment, corona discharge treatment, and electron beam irradiation are preferred in terms of processing speed. However, any treatment that has radiation energy to some degree and can modify the material can be employed.

<<Plasma Treatment>>

In plasma treatment, a plasma generator may be, for example, a parallel plate generator, a capacitive coupling plasma generator, an inductive coupling generator, or an atmospheric pressure plasma device. In terms of durability, a reduced pressure plasma treatment is preferred.

The reaction pressure in plasma treatment is not limited and can be selected as appropriate according to the purpose. The reaction pressure is preferably 0.05 Pa to 100 Pa, more preferably 1 Pa to 20 Pa.

The reaction atmosphere in plasma treatment is not limited and can be selected as appropriate according to the purpose. For example, gasses such as inert gas, rare gas, and oxygen are effective, and argon is preferred in terms of persistent of effect.

In this regard, the oxygen partial pressure is preferably set to 5,000 ppm or lower. If the oxygen partial pressure in the reaction atmosphere is 5,000 ppm or lower, the production of ozone can be reduced, and the use of an ozone treatment device can be refrained.

The radiation power in plasma treatment is defined by (output×radiation time). The radiation power is preferably 5 Wh to 200 Wh, more preferably 10 Wh to 50 Wh. If the radiation power is within the preferred range, it is possible to give a power generating function to the intermediate layer, and the durability is not reduced due to excessive radiation.

<<Corona Discharge Treatment>>

The energy applied in corona discharge treatment (total energy) is preferably 6 J/cm$^2$ to 300 J/cm$^2$, more preferably 12 J/cm$^2$ to 60 J/cm$^2$. If the energy applied is within the preferred range, it is possible to give a power generating function to the intermediate layer, and the durability is not reduced due to excessive radiation.

<<Electron Beam Irradiation>>

The radiation dose in electron beam irradiation is preferably 1 kGy or higher, more preferably 300 kGy to 10 MGy. If the radiation dose is within the preferred range, it is possible to give a power generating function to the intermediate layer, and the durability is not reduced due to excessive radiation.

The reaction atmosphere in electron beam irradiation is not limited and can be selected as appropriate according to the purpose. It is preferable that inert gas such as argon, neon, helium, and nitrogen is charged and the oxygen partial pressure is 5,000 ppm or lower. If the oxygen partial pressure in the reaction atmosphere is 5,000 ppm or lower, the production of ozone can be reduced, and the use of an ozone treatment device can be refrained.

<<Ultraviolet Irradiation>>

The ultraviolet rays in ultraviolet irradiation preferably have wavelengths of 365 nm to 200 nm, more preferably wavelengths of 320 nm to 240 nm.

The total amount of light in ultraviolet irradiation is preferably 5 J/cm$^2$ to 500 J/cm$^2$, more preferably 50 J/cm$^2$ to 400 J/cm$^2$. If the total amount of light is within the preferred range, it is possible to give a power generating function to the intermediate layer, and the durability is not reduced due to excessive radiation.

The reaction atmosphere in ultraviolet irradiation is not limited and can be selected as appropriate according to the purpose. It is preferable that inert gas such as argon, neon, helium, and nitrogen is charged and the oxygen partial pressure is set to 5,000 ppm or lower. If the oxygen partial pressure in reaction atmosphere is 5,000 ppm or lower, the production of ozone can be reduced, and the use of an ozone treatment device can be refrained.

A known technique proposes forming an active group through excitation or oxidization by plasma treatment, corona discharge treatment, ultraviolet irradiation, electron beam irradiation, or other treatment and increasing the interlayer adhesion. This technique, however, is limited to the application to the interlayer and it has been found that the application to the outermost surface is unpreferable because the releasability is reduced. Further, the reaction proceeds in an oxygen rich state, and a reaction active group (hydroxyl) is effectively introduced. Such a conventional technique therefore essentially differs from the surface modification treatment in the present embodiment.

The surface modification treatment in the present embodiment, which is a process (for example, plasma treatment) in a reaction environment with little oxygen and a reduced pressure, promotes re-crosslinking and bonding at the surface and improves durability as a result of "increase of Si—O bonds with high bond energy", for example.

In addition, "higher density resulting from improvement in cross-linkage density" possibly improves the releasability. Although an active group is partially formed even in the present embodiment, the active group is inactivated by a coupling agent or air drying as described later.

<Inactivation Treatment>

The surface of the intermediate layer may be subjected to an inactivation treatment as appropriate using a variety of materials.

The inactivation treatment may be any treatment that inactivates the surface of the intermediate layer and can be selected as appropriate according to the purpose. For example, an inactivating agent may be applied on the surface of the intermediate layer. Inactivation means changing the surface of the intermediate layer to be less prone to chemical reactions. This change is achieved by allowing an active group (for example, —OH) generated through excitation or oxidation by plasma treatment, corona discharge treatment, ultraviolet irradiation, or electron beam irradiation to react with an inactivating agent to reduce the reactivity of the surface of the intermediate layer.

Examples of the inactivating agent include amorphous resin and a coupling agent. Examples of the amorphous resin include a resin having a perfluoropolyether structure in the main chain.

Examples of the coupling agent include metal alkoxide and a solution including metal alkoxide.

Examples of the metal alkoxide include a compound of general formula (1) below, a partially hydrolyzed polycondensate thereof with a degree of polymerization of about 2 to 10, or 4 mixture thereof.

$$R^1_{(4-n)}Si(OR^2)_n \qquad \text{general formula (1)}$$

In general formula (1), $R^1$ and $R^2$ are each independently any one of a straight-chain or branched alkyl group having a carbon number of 1 to 10, an alkyl polyether chain, and an aryl group, where n is an integer of 2 to 4.

The inactivation treatment can be performed, for example, by performing the surface modification treatment on an intermediate layer precursor such as rubber and thereafter impregnating the surface of the intermediate layer precursor with an inactivating agent with coating, dipping, or the like.

When silicone rubber is used as the intermediate layer precursor, leaving in the air and air drying may be performed for deactivation after the surface modification treatment.

The profile of oxygen concentration in the thickness direction of the intermediate layer preferably has a local maximum. The profile of carbon concentration in the thickness direction of the intermediate layer preferably has a local minimum.

In the intermediate layer, it is more preferable that the position indicating the local maximum of the profile of oxygen concentration matches the position indicating the local minimum of the profile of carbon concentration.

The profile of oxygen concentration and the profile of carbon concentration can be obtained by X-ray photoelectron spectroscopy (XPS).

An example of the measurement process is as follows.

{Measurement Process}

Measuring device: Ulvac-PHI QuanteraSXM manufactured by ULVAC-PHT, INCORPORATED.

Measurement light source: Al (mono)
Measurement output: 100 μmφ, 25.1 W
Measurement region: 500 μm×300 μm
Pass energy: 55 eV (narrow scan)
Energy step: 0.1 eV (narrow scan)
Relative sensitivity coefficient: relative sensitivity coefficient of PHI was used
Sputter source: C60 cluster ion
Ion Gun output: 10 kV, 10 nA
Raster Control: (X=0.5, Y=2.0) mm
Sputter rate: 0.9 nm/min (in terms of $SiO_2$)

In XPS, electrons emitted by the photoelectric effect are captured to determine the concentration ratio or the bonding state of atoms in the measurement target object.

Figure 11:
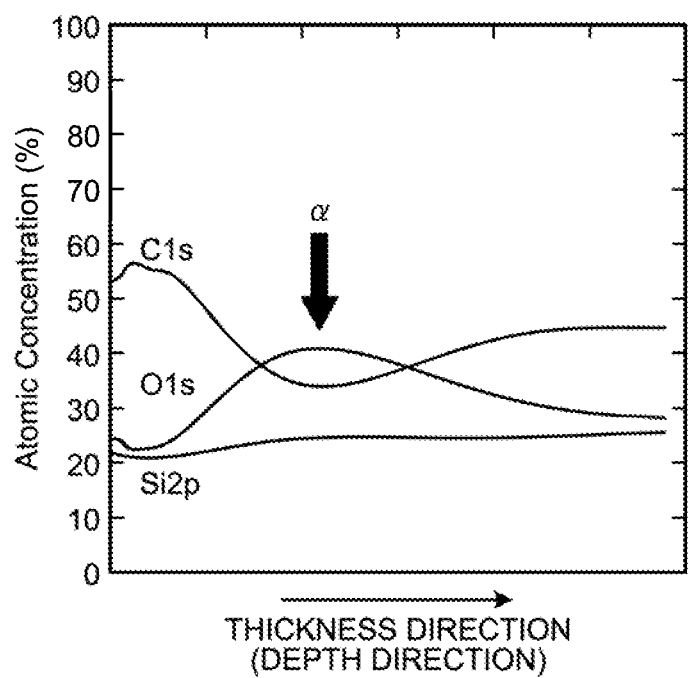
FIG. 11 is a characteristic graph illustrating an XPS measurement result of an intermediate layer (silicone rubber) subjected to a surface modification treatment and an inactivation treatment.

Silicone rubber has a siloxane bond and mainly contains Si, O, and C. Therefore, when silicone rubber is used as the material of the intermediate layer, the concentration ratio in the depth direction of each atom present from the surface layer to the inside can be determined from the relative peak intensity ratio of the elements by measuring the wide-scan spectra in XPS. FIG. 11 illustrates an example thereof. Here, the atoms are Si, O, and C and the concentration ratio is expressed in atomic %.

FIG. 11 illustrates an intermediate layer sample formed of silicone rubber and further subjected to the surface modification treatment (plasma treatment) and the inactivation treatment. In FIG. 11, the horizontal axis indicates the analysis depth in a direction from the surface to the inside, and the vertical axis indicates the concentration ratio.

In the case of silicone rubber, an element bonded to silicon and a bonding state can be determined by measuring energy of emission of electrons from the 2p orbital of Si. Then, peak separation was performed from the narrow-scan spectrum in the Si2p orbital representing the bonding state of Si, to determine a chemical bonding state.

Figure 12:
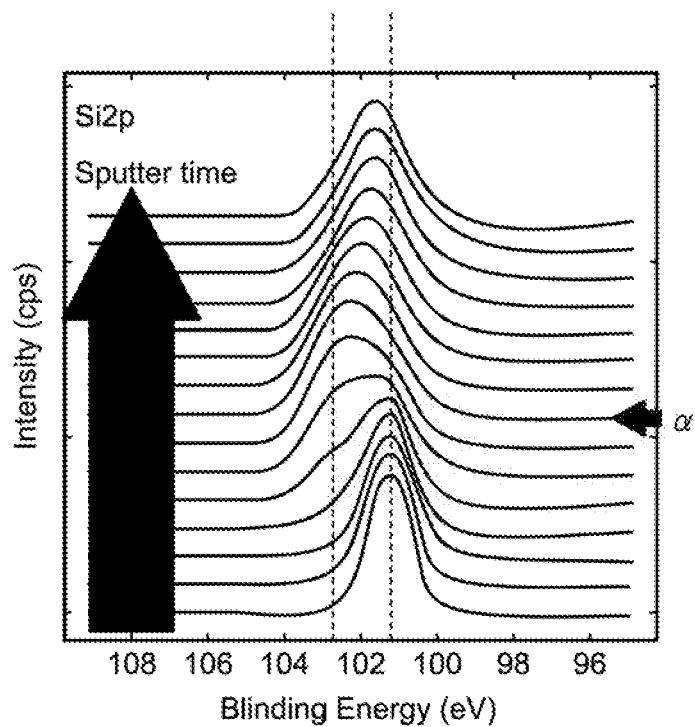
FIG. 12 is a graph illustrating change in thickness direction of Si2p binding energy of the intermediate layer as measured in FIG. 11.

FIG. 12 illustrates the result. The measurement target in FIG. 12 is the sample used in measurement in FIG. 11. In FIG. 12, the horizontal axis indicates binding energy, and the vertical axis indicates the intensity ratio. The measurement spectra are also illustrated in the depth direction from the bottom to the top.

It is commonly known that the amount of peak shift depends on the bonding state. For silicone rubber in this case, shifting of the peak toward the higher energy in the Si2p orbital indicates that oxygen bonded to Si increases.

Based on this, when silicone rubber is subjected to the surface modification treatment and the inactivation treatment, oxygen increases from the surface layer toward the inside and has a local maximum, while carbon decreases from the surface layer toward the inside and has a local minimum. When further advancing the analysis in the depth direction, oxygen decreases while carbon increases, and the atomic concentration becomes almost equivalent to the untreated silicone rubber.

The local maximum of oxygen detected at α in FIG. 11 matches the Si2p binding energy shifting toward the higher energy (at α in FIG. 12) and indicates that the oxygen increase is caused by the number of oxygen bonded to Si.

Figure 13:
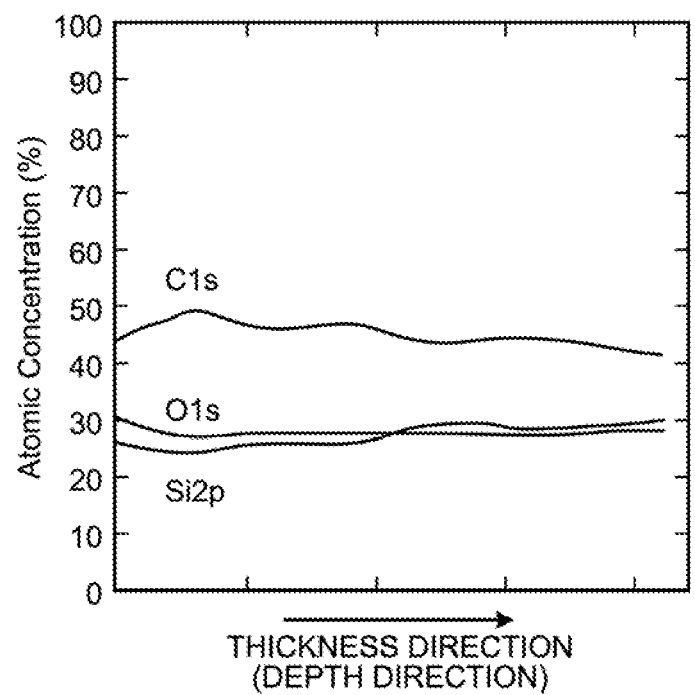
FIG. 13 is a characteristic graph illustrating an XPS measurement result of an untreated intermediate layer (silicone rubber).
Figure 14:
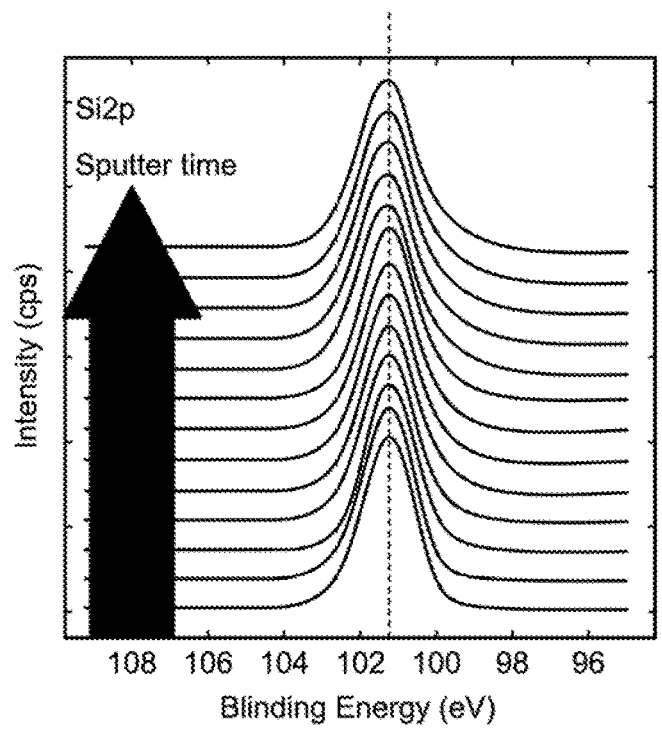
FIG. 14 is a graph illustrating change in thickness direction of Si2p binding energy of the intermediate layer as measured in FIG. 13.

FIG. 13 and FIG. 14 illustrate the result of similar analysis on the untreated silicone rubber. In FIG. 13, the local maximum of oxygen concentration or the local minimum of carbon concentration as can be seen in FIG. 11 are not observed. Since the Si2p binding energy shift toward the higher energy is not observed in FIG. 14, it was confirmed that the number of oxygen bonded to Si did not change.

As described above, an inactivating agent such as a coupling agent is coated or dipped on the surface of the intermediate layer to cause the inactivating agent to permeate the surface, so that the inactivating agent penetrates the intermediate layer. When the coupling agent is a compound of general formula (1), polyorganosiloxane is present with a concentration distribution in the intermediate layer, and this distribution is such that oxygen atoms included in polyorganosiloxane have a local maximum in the depth direction.

Consequently, the intermediate layer contains polyorganosiloxane having a silicon atom bonded to three to four oxygen atoms.

The inactivation treatment is not limited to a dipping process. For example, the inactivation treatment may be any process that can achieve a distribution in which oxygen atoms included in polyorganosiloxane have a local maximum in the depth direction (thickness direction) of the intermediate layer. Examples of such a process include plasma CVD, PVD, sputtering, vacuum vapor deposition, and combustion chemical vapor deposition.

The intermediate layer need not have an initial surface potential in a still state. The initial surface potential in a still state can be measured under the measurement conditions below. Here, not having an initial surface potential means±10 V or lower when the measurement is performed under the measurement conditions below.

{Measurement Conditions}
Pretreatment: left still for 24 hours in an atmosphere with temperature of 30° C. and relative humidity of 40%, followed by neutralization for 60 sec (using SJ-F300 manufactured by Keyence Corporation)
Apparatus: Treck Model 344
Measurement probe: 6000B-7C
Measurement distance: 2 mm
Measurement spot diameter: 10 mm In the device of the present embodiment, it is assumed that electrification by a mechanism similar to frictional electrification and occurrence of a surface potential difference by internal charge storage produce capacitance polarization due to the difference in amount of deformation based on the hardness difference between both surface of the intermediate layer, causing charge transfer and power generation.

It is preferable that the device has a space between the intermediate layer and at least one of the first electrode and the second electrode. The amount of generated power can be thereby increased.

The method of providing the space is not limited and can be selected as appropriate according to the purpose. The examples of the method include arranging a spacer between the intermediate layer and at least one of the first electrode and the second electrode.

The material, form, shape, size, and the like of the spacer are not limited and can be selected as appropriate according to the purpose. Examples of the material of the spacer include polymer materials, rubbers, metals, conductive polymer materials, and conductive rubber compositions.

Examples of the polymer materials include polyethylene, polypropylene, polyethylene terephthalate, polyvinyl chloride, polyimide resin, fluoroplastic, and acrylic resin. Examples of the rubbers include silicone rubber, modified silicone rubber, acrylic rubber, chloroprene rubber, polysulfide rubber, urethane rubber, isobutyl rubber, fluorosilicone rubber, ethylene rubber, and natural rubber (latex).

Examples of the metals include gold, silver, copper, aluminum, stainless steel, tantalum, nickel, and phosphor bronze. Examples of the conductive polymer materials include polythiophene, polyacetylene, and polyaniline. Examples of the conductive rubber compositions include a composition containing a conductive filler and rubber. Examples of the conductive filler include carbon materials (for example, Ketjen black, acetylene black, graphite, carbonaceous fibers, carbon fibers, carbon nanofibers, carbon nanotubes, graphene), metals (for example, gold, silver, platinum, copper, iron, aluminum, nickel, conductive polymer materials (for example, a derivative of any one of polythiophene, polyacetylene, polyaniline, polypyrrole, poly(p-phenylene), and poly(p-phenylene vinylene), or the derivative doped with anions or cations), and ionic liquid.

Examples of the rubber include silicone rubber, modified silicone rubber, acrylic rubber, chloroprene rubber, polysulfide rubber, urethane rubber, isobutyl rubber, fluorosilicone rubber, ethylene rubber, and natural rubber (latex).

Examples of the form of the spacer include sheet, film, fabric, nonwoven fabric, mesh, and sponge.

The shape, size, thickness, and installation location of the spacer can be selected as appropriate according to the structure of the device.

Figure 15:
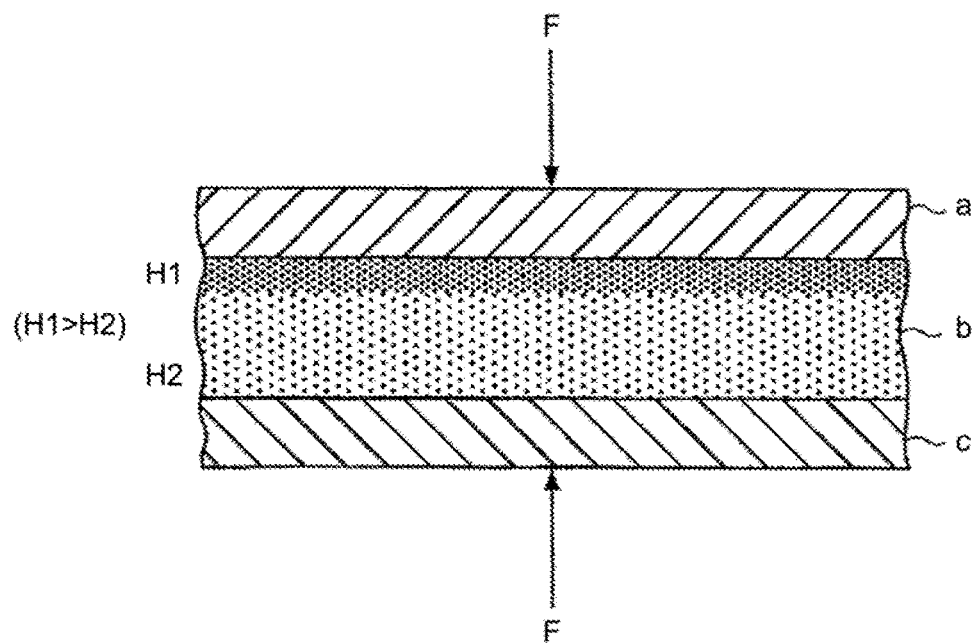
FIG. 15 is a cross-sectional schematic view for explaining the characteristics of a device having the intermediate layer subjected to a surface modification treatment and an inactivation treatment.

As illustrated in FIG. 15, given that the first electrode is denoted by a, the intermediate layer is denoted by b, and the second electrode is denoted by c, when the surface modification treatment or the inactivation treatment is performed on the side at the first electrode a, of the intermediate layer b, the side at the first electrode a, of the intermediate layer b is harder than the side at the second electrode c. Therefore, the universal hardness is H1>H2.

When the identical deforming force, that is, pressing force F acts on the side at the first electrode a and the side at the second electrode c, the degree of deformation at the side at the first electrode a, of the intermediate layer b is smaller than at the side at the second electrode c.

Although preferable embodiments of the present invention have been described above, the present invention is not limited to certain embodiments and are susceptible to various modifications and changes without departing from the spirit of the present invention recited in the claim, unless otherwise specified in the foregoing description.

The advantageous effects described in the embodiments of the present invention merely illustrate most preferred effects derived from the present invention, and the advantageous effects of the present invention are not limited to what is described in the embodiments of the present invention.

REFERENCE SIGNS LIST 2 robot
4 part serving as target object
18, 50 gripping device
20, 22 gripper
24 pressure-sensitive sensor
26 first electrode serving as electrode
28 second electrode serving as electrode
30 intermediate layer
32 cover

CITATION LIST

Patent Literature

Patent Literature 1: Japanese Patent Application Laid-open No. 2013-99130

The invention claimed is:

1. A pressure-sensitive sensor, comprising:
   a pair of electrodes; and
   an intermediate layer between the pair of electrodes, the intermediate layer being formed of a polymer or a polymer composition and configured to cause electrification to occur between the intermediate layer and the electrodes and generate electricity when deformed by contact with a target object, wherein
   the pressure-sensitive sensor has a stack structure in which the intermediate layer is sandwiched on both sides in a thickness direction by the pair of electrodes; and
   one side in a stacking direction of the intermediate layer is subjected to a surface modification treatment such that a degree of deformation for an identical deforming force differs between the one side and the other side.

2. The pressure-sensitive sensor according to claim 1, wherein a surface of an electrode configured to come into contact with the target object, from among the pair of electrodes, is covered with a cover having flexibility.

3. The pressure-sensitive sensor according to claim 1, wherein the side subjected to the surface modification treatment of the intermediate layer and an electrode opposed to the side are disposed such that frictional electrification or peeling electrification occurs during the deformation.

4. The pressure-sensitive sensor according to claim 1, wherein the intermediate layer comprises silicone rubber.

5. The pressure-sensitive sensor according to claim 4, wherein the silicone rubber has an organopolysiloxane bond and has a concentration profile in which oxygen increases from the side subjected to the surface modification treatment toward an inside of the intermediate layer and has a local maximum, and carbon decreases from the side subjected to the surface modification treatment toward the inside of the intermediate layer and has a local minimum.

6. A gripping device comprising the pressure-sensitive sensor of claim 1 in a gripper configured to grip the target object or grip the target object in cooperation with another member.

7. A robot comprising the gripping device of claim 6.

8. The pressure-sensitive sensor of claim 1, wherein the intermediate layer has a Young's modulus of less than 0.1 Gpa.

* * * * *